Aug. 4, 1942.  C. H. MATSON  2,292,142
FISHING ROD BUTT
Filed April 24, 1941  2 Sheets-Sheet 1
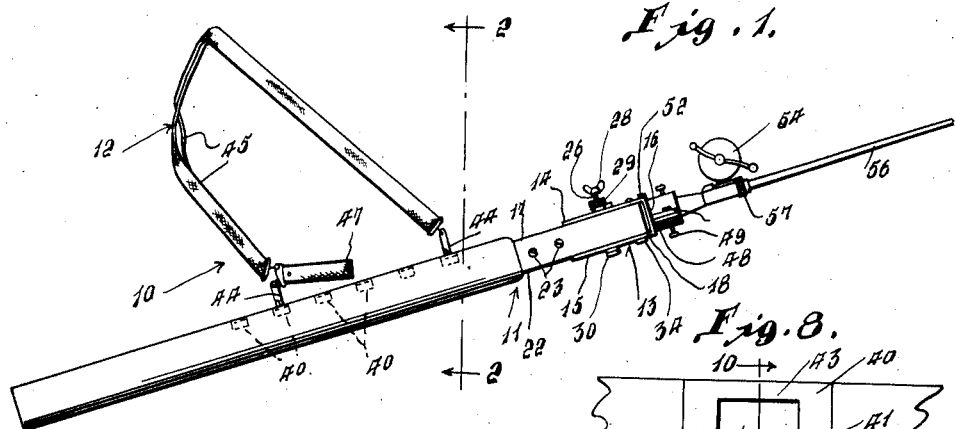
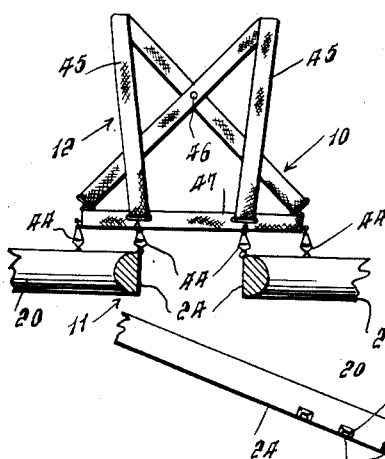
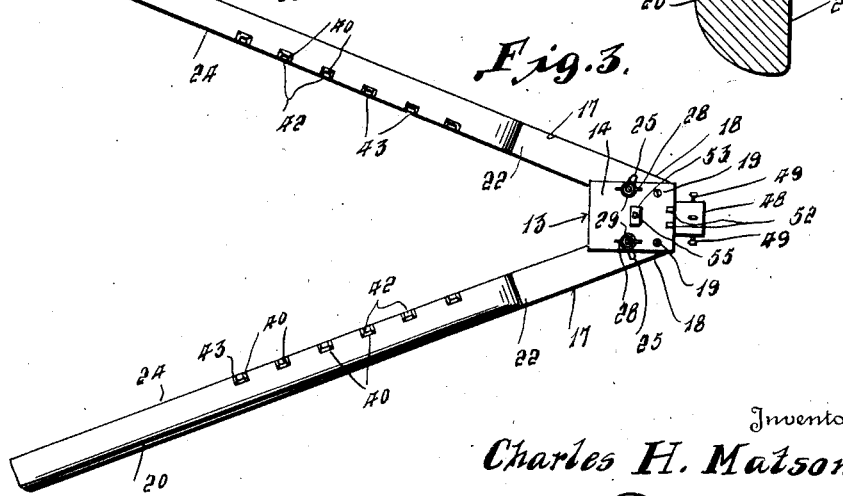
Inventor
Charles H. Matson
Attorney

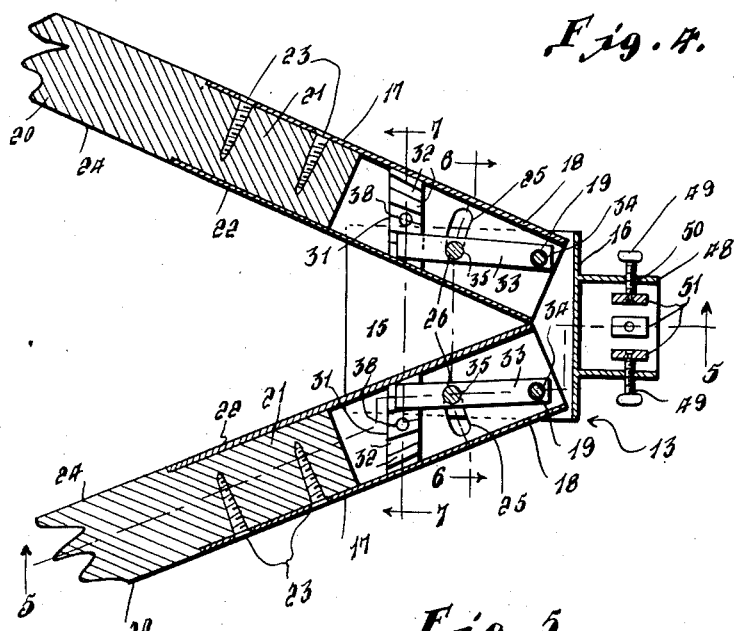
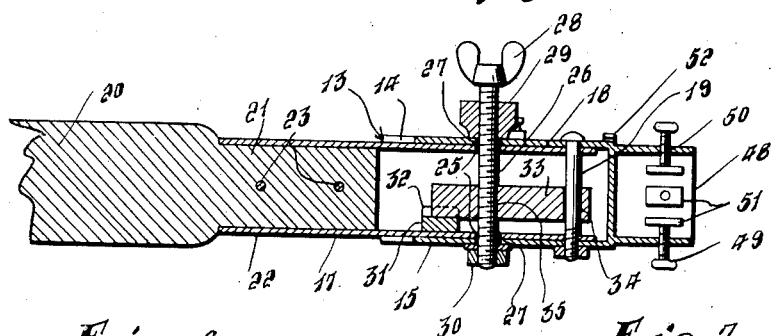
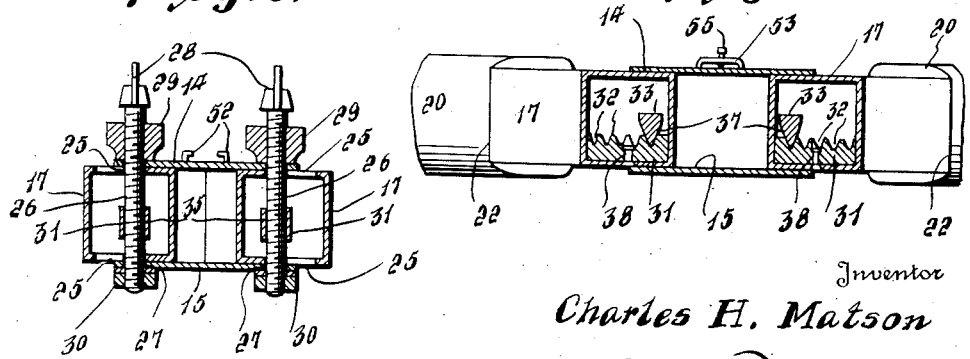

Patented Aug. 4, 1942

2,292,142

UNITED STATES PATENT OFFICE 2,292,142

FISHING ROD BUTT

Charles H. Matson, New York, N. Y.

Application April 24, 1941, Serial No. 390,171

2 Claims. (Cl. 224—5)

This invention relates to a detachable butt for fishing rods and more particularly to a butt formed of pivotally mounted sections or arms adapted to engage a fisherman, one on either side of his body, and equipped with a shoulder harness for supporting the fishing rod butt and a rod connected thereto on the body of the fisherman.

More particularly, it is an aim of the invention to provide an attachment especially adapted for use in surf fishing and in fishing for game fish which can be used in lieu of holsters and similar means for supporting a fishing rod.

Still another aim of the invention is to provide an adjustable fishing rod butt wherein the pivoted sections or arms may be adjusted to fit the body of the user and wherein the harness may also be adjusted relatively to the fishing rod butt for comfortably supporting the fishing rod and butt.

Still a further aim of the invention is to provide a device of simple construction, capable of being economically manufactured and sold, and which may be atttached to any conventional fishing rod.

Other objects and advantages of the invention will hereinafter become more fully apparent from the following description of the drawings, which illustrate a preferred embodiment thereof, and wherein—

Figure 1 is a side elevational view of the attachment assembled and connected to a fishing rod, Figure 2 is a transverse vertical sectional view taken substantially along the plane of the line 2—2 of Figure 1, Figure 3 is a top plane view of the improved fishing rod butt with the harness removed, Figure 4 is an enlarged fragmentary top plan view of the fishing rod butt, shown partly in section, Figure 5 is a longitudinal sectional view partly in elevation, taken substantially along the plane indicated by the line 5—5 of Figure 4, Figures 6 and 7 are transverse sectional views taken substantially along the planes indicated by the lines 6—6 and 7—7 of Figure 4, Figure 8 is an enlarged fragmentary side elevational view looking toward the inner side of one of the sections or arms of the butt, Figure 9 is a top plan view of the same portion, and Figure 10 is a transverse sectional view taken substantially along the plane of the line 10—10 of Figure 8.

Referring more particularly to the drawings, wherein like reference characters designate like or corresponding parts throughout the different views, 10 designates generally the invention which includes the fishing rod butt, designated generally 11 and the body engaging harness, designated generally 12.

The butt 11 includes a substantially U-shaped head 13 comprising top and bottom portions 14 and 15, respectively, and an end portion 16, forming the forward end of the head 13.

A pair of corresponding socket members 17 have corresponding ends 18 disposed in the head 13, between the top and bottom portions 14 and 15, and pivotally connected to the head by nut and bolt fastenings 19. A bolt of the nut and bolt fastenings 19 extends through the end 18 of each of the socket members 17. The socket members 17 project from the head 13 in a direction away from its forward end 16. As best seen in Figure 7, the socket members 17 are substantially rectangular in cross section.

A pair of corresponding arms 20 are each provided with a restricted end 21. The ends 21 are sized to snugly fit into the opposite, rear ends 22 of the socket members 17 and are secured therein by means of screw fastenings 23. As best seen in Figures 2 and 10, the arms 20 are substantially semi-circular in cross section with the flat sides 24 thereof forming the inner, adjacent sides of the pair of arms 20.

The top and bottom portions of the ends 18 of the socket members 17 are provided with transversely disposed alined, arcuately shaped slots 25 which are disposed between the ends 22 and the fastenings 19. A threaded bolt 26 extends through each of the pairs of slots 25 and through the top and bottom portions 14 and 15, respectively. The bolts 26 are loosely mounted in openings 27 in the portions 14 and 15 and in the slots 25. The bolts 26 are provided with wing shaped heads 28, disposed above and spaced from the top portion 14 and carry lock nuts 29, which are disposed between the heads 28 and the top 14. A nut and washer 30 are mounted on the opposite end of each of the bolts 26 and beneath the bottom 15 for retaining the bolts 26 in position.

A bar 31 is secured in each of the ends 18 and to the bottom portion thereof, between the slots 25 and the end 22. The bars 31 are disposed transversely of the tubular members 17 and at oblique angles, as seen in Figure 4. The upper sides of the bars 31 are provided with transverse notches 32, for a purpose which will hereinafter become apparent. A latch bar 33 is disposed in each of the ends 18. Each of the latch bars 33 is provided with an opening 34, adjacent one end thereof, for loosely engaging the bolt of the fastening 19, which extends through the end 18 in which said bar 33 is disposed. Bars 33, adjacent their opposite ends, are provided with threaded openings 35 for engaging the threads of the shanks of the bolts 26. The opposite ends of the bars 33 are beveled on their undersides to provide the portions 36, as best seen in Figure 7, which are adapted to engage the notches 32. As seen in Figure 7, the bars 31 are secured to the bottom portions of the sockets 17 by means of rivets or other suitable fastenings 38.

Referring to Figures 8, 9 and 10, the arms 20 are provided with recesses 39 which open outwardly of their upper portions and their inner sides 24 and which are covered by angular plates 40 which are secured to the arms 20 by fastenings 41. Each of the plates 40 is provided with an opening 42 in each of its sides, as best seen in Figure 10, said openings 42 forming bar portions 43 in the plate 40. The openings 42 open into the recesses 39 and the bar portions 43 form fixed keeper portions which are adapted to be engaged by conventional spring fastenings 44.

The spring fastenings 44 are connected to a body engaging harness 12, including a pair of shoulder straps 45 to the ends of which the fastenings 44 are connected. The shoulder straps 45, as best seen in Figure 2, are crossed and fastened at 46 adjacent their rear ends. A strap 47 is also attached to the pair of fastenings 44, which are attached to the rear ends of the straps 45. The strap 47 is adapted to fit across the front of the waist.

A socket member 48 is fastened to and projects forwardly from the front portion 16 of the head 13, as best seen in Figure 4, and is provided with a plurality of set screws 49 which engage threaded openings 50 in the socket 48. A plate 51 is swivelly connected to the inner end of each of the set screws 49. The top portion 14 is provided with a reel receiving portion 52, as seen in Figure 6, and a reel receiving portion 53 which portions are adapted to engage the base of a conventional fishing reel 54. The portion 53, as seen in Figure 7, is arch shaped and is provided with a set screw 55 for securing the base of the reel 54 to the head 13.

The socket 48 is adapted to receive the inner or butt end of a conventional fishing rod 56, which is secured in the socket 48 by advancing the set screws 49.

From the foregoing it will be apparent that the arms 20 can be adjusted to fit the body of a fisherman, not shown, by retracting the lock nuts 29 toward the bolt heads 28 so that the bolts 26 can be turned for moving the latch bars 33 upwardly to release the socket members 17 so that they can be swung relatively to the head 13 to properly adjust the arms 20. The bolts 26 are then turned in the opposite direction to bring the latch bar 33 back to engagement with the bars 31 for latching the arms 20 in adjusted positions. The harness 12 can be applied with the straps 45 engaging over the shoulders and with said straps being crossed at the back of the fisherman and the strap 47 disposed across the waist, after which the fastenings 44 are selectively connected to the bars 43, as illustrated in Figures 1 and 2, so that the harness 12 will snugly fit across the front of the waist and over the shoulders of the fisherman. It will be obvious that the reel 54 can either be mounted on the head 13, as previously described, or by conventional mounting means 57 on the rod 56, as illustrated in Figure 1. When the invention is thus applied to a fishing rod and to the body of the fisherman, it will be obvious that the weight of the fishing rod and reel will be supported by the harness 12 and the arms 20 so that it is unnecessary for the fisherman to support the weight of the rod and reel in his hands.

Various modifications and changes are contemplated and may obviously be resorted to as only a preferred embodiment of the invention has been disclosed.

I claim as my invention:

1. A fishing rod butt comprising a head member, socket members having corresponding ends pivotally mounted in the head member, locking means associated with the head member for locking said socket members in a plurality of adjusted positions relatively to one another and to the head member, arms secured in and projecting from the opposite ends of the socket members, said locking means comprising bolts extending through the head and through said socket members for pivotally connecting the socket members and head, said socket members being provided with arcuately shaped transversely disposed slots, bolts extending through said slots and head and turnably mounted relatively to said portions, notched bars fixedly positioned in said socket members and disposed transversely thereof, and latch bars disposed in said socket members and loosely connected to said first mentioned bolts, said latch bars having threaded openings for engaging said last mentioned bolts and beveled ends for engaging said notched bars, said last mentioned bolts being turnable for moving said latch bars toward and away from the notched bars.

2. An attachment for fishing rods comprising a head member constituting the forward end of a fishing rod butt, said head member including two side members and an end member, said end member providing means against which the end of the fishing rod abuts; arms having their corresponding forward ends pivotally mounted in the head member between said side members, locking means associated with the head member for locking said arms in a plurality of adjusted positions relatively to one another and to the head member, said arms forming the rear end of the butt, said head member being provided with means projecting in the opposite direction to said arms for detachably engaging said end of the fishing rod.

CHARLES H. MATSON.